Patented Oct. 5, 1954

2,690,993

UNITED STATES PATENT OFFICE 2,690,993

SEPARATION OF ORGANIC ACIDS FROM OXYGENATED ORGANIC COMPOUNDS BY AZEOTROPIC DISTILLATION WITH WATER

Henry G. McGrath, Elizabeth, N. J., assignor to The M. W. Kellogg Company, Jersey City, N. J., a corporation of Delaware No Drawing. Application October 28, 1948, Serial No. 57,123

19 Claims. (Cl. 202—42)

This invention relates to the separation of organic compounds and relates more particularly to the separation of organic acids from other oxygenated organic compounds. Still more particularly, the invention relates to the separation of organic acids from mixtures thereof with other oxygenated organic compounds wherein the latter comprise alcohols alone, or alcohols containing other non-acid oxygenated organic compounds such as aldehydes, ketones or esters, individually or in any admixture thereof, as additional components.

As is well known to those skilled in the art, conventional methods for separating mixtures of water-soluble organic acids and non-acid oxygenated organic compounds normally comprise neutralizing such mixtures, distilling non-acidics from the thus formed alkali salts, and regenerating the acids from the latter by contacting the remaining residue with a mineral acid, such as sulfuric acid or hydrochloric acid. Other conventional methods comprise subjecting the aforementioned mixtures to distillation to effect separation between acids and non-acid oxygenated organic compounds. In practicing the aforementioned conventional separations, either by neutralization or simple fractional distillation, the necessitated addition of neutralizing agents and further regeneration of acids from their formed alkali salts on the one hand, or the incomplete separation of acids from non-acids because of resulting esterification between acids and alcohols, polymerization of aldehydes, or exchange reactions between acids and esters, on the other, leaves much to be desired from a standpoint of economics or ease of separation. These disadvantages are especially apparent when the mixtures to be treated are substantially water-free or contain relatively minor amounts of water.

It is, therefore, an object of the present invention to provide for an improved method for the economical and efficient separation of the components of mixtures comprising a water-soluble organic acid and an alcohol.

Another object of the invention is to provide for an improved method for the economical and efficient separation of the components of mixtures comprising a water-soluble organic acid and an alcohol, wherein the mixture may contain other non-acid oxygenated organic compounds, either individually or in any admixture thereof, as additional components.

Other objects and advantages inherent in the invention will be apparent from the following more detailed disclosure.

I have found that the aforementioned mixtures of water-soluble organic acids and alcohols may be readily and substantially completely separated by a method of fractional distillation, in which the mixture is charged into a fractional distillation zone together with a substantial amount of water to form a vapor phase and a liquid phase, the alcohol being removed as vapor and the acid as a residue, and the quantity of water charged to the distillation zone being sufficient to maintain in the resulting formed liquid phase, a substantial amount to prevent ester formation between the acid and the alcohol in the liquid phase. In instances where the mixtures of water-soluble organic acids and alcohols also contain other oxygenated organic compounds such as aldehydes, ketones or esters, the quantity of water charged into the fractionation zone along with the mixture of acids and non-acidics, is in such amount as is sufficient to maintain in the distillation zone an excess over the amount required to form minimum boiling azeotropes with the alcohols and with the other non-acid oxygenated organic compounds present. It is immaterial, in so far as the operation of the aforementioned process of the invention is concerned, whether the aforementioned quantity of water introduced into the distillation zone is present in slight or large excess, inasmuch as excess quantities of water over the amount required to prevent ester formation between acids and alcohols, or over the amounts required to form minimum boiling azeotropes with the alcohols and other oxygenated organic compounds present, will be withdrawn in the liquid residue of acids in aqueous solution, as bottoms from the distillation tower.

In effecting the aforementioned separation between water-soluble organic acids, alcohols and other non-acid oxygenated organic compounds, it is preferable that the distillation tower be operated at atmospheric pressure, although pressures above or below atmospheric pressure may also be successfully employed provided that azeotropic formation of water with non-acids is not prevented. The temperature at which the distillation tower is operated will depend in each instance upon the respective boiling points of the acids and the formed water azeotropes of alcohols and other non-acid oxygenated compounds present, the former being removed as a relatively high-boiling fraction as aqueous bottoms, and the latter as a relatively low-boiling fraction in the form of vapors which are to a great extent azeotropes and may be subsequently condensed to form liquid. The liquid azeotropes thus formed may be subsequently treated by conventional methods, known to those skilled in the art, for the recovery of substantially water-free alcohols or other non-acid oxygenated organic compounds comprising these azeotropic mixtures.

It will be noted that in certain instances the mixtures to be treated may contain non-acidics which do not form minimum boiling azeotropes with water. This is especially the case where the mixture to be treated is present as an aqueous mixture of water-soluble organic acids and alcohols and other non-acid oxygenated compounds, obtained from the treatment of the reaction product produced in processes for the catalytic hydrogenation of oxides of carbon. Such mixtures, for example, may contain water-soluble organic acids having up to five carbon atoms per molecule, and also alcohols, aldehydes and other oxygenated organic compounds which do not form minimum boiling azeotropes with water, such as methanol, acetaldehyde, propionaldehyde. In such instances, these non-azeotropic forming materials will be taken over as vapors together with the water azeotropes or other non-acid oxygenated compounds present in the distillation tower, and hence will not effect the operability of the process.

In practicing the process of the invention, it will be noted that the operating conditions are not highly critical. The only degree of care necessitated lies in maintaining at all times an excess of water in the distillation zone, so that none or very small proportions of the acids distill over in the vapor phase together with the non-acidics as esters, aldehyde polymers or other reaction products; and also that the excess of water be sufficiently high so that there is a sufficient quantity present at all times to form minimum boiling azeotropes with those non-acid oxygenated compounds capable of forming them. By the term "water-soluble organic acids" as used throughout this description, is meant any acid which may be miscible with water, regardless of the degree of such miscibility; whereas the alcohols and other non-acid oxygenated organic compounds present in the mixtures to be treated, for example, aldehydes, ketones or esters, need not necessarily be miscible with water in any degree, and hence may include highly water-soluble non-acid chemicals such as methanol or ethanol, or slightly water-soluble and water-insoluble compounds having as high as eight or more carbon atoms per molecule. Hence, the only essential characteristic of the components of the mixture to be treated, lies in the organic acids present having some miscibility with water, although the process of the invention has a particular applicability to those acids which are highly soluble in water, for example, acids having up to five carbon atoms per molecule.

In order to illustrate the high degree of separation obtainable between the water-soluble organic acids and alcohols (which may include other non-acid oxygenated organic compounds, as previously indicated) in practicing the process of the present invention, the following data were obtained employing varying aqueous mixtures of water-soluble ($C_1$–$C_5$) organic acids, containing varying non-acidics comprising alcohols, aldehydes, ketones and esters in the form of water-product liquid phases, produced by the condensation of the reaction effluent obtained in processes for the catalytic oxidation of oxides of carbon. As is well known, such mixtures include acids and non-acids of close-boiling points which on distillation produce a distillate containing a substantial amount of acids.

Table I

| Run Number | 1 | 2 | 3 | 4 | 5 | 6 |
|---|---|---|---|---|---|---|
| Feed, g./hr | 576.0 | 505.0 | 546.7 | 470.5 | 549.1 | 510.7 |
| Distillate, g./hr | 42.7 | 36.5 | 37.0 | 59.0 | 41.8 | 42.6 |
| Bottoms, g./hr | 532.0 | 469.1 | 504.9 | 390.0 | 501.3 | 461.3 |
| Reflux Ratio | 35 | 40 | 40 | 15 | 12 | 14 |
| Top Temperature, °F | 183 | 182 | 181 | 198 | 184 | 191 |
| Still Temperature, °F | 214 | 214 | 214 | 214 | 214 | 214 |
| Yields, Wt. Percent: | | | | | | |
|   Distillate | 7.4 | 7.2 | 6.8 | 12.5 | 7.6 | 8.4 |
|   Bottoms | 92.3 | 92.8 | 93.2 | 82.8 | 91.5 | 90.2 |
|   Overhead: Non-Acid in Feed | 1.06 | 1.03 | 0.97 | 1.79 | 1.09 | 1.19 |
|   Wt. Balance | 99.7 | 100.1 | 98.3 | 95.3 | 99.1 | 98.6 |
| Chemicals, Recovery Percent: | | | | | | |
|   Alcohols in Distillate | | 99.4 | 94.7 | 99.5 | 99.4 | |
|   Acids in Bottoms | 98.0 | 100 | 102 | 87.5 | 96.7 | 97.5 |
| Chemicals, Loss Percent: | | | | | | |
|   Alcohols in Bottoms | 0.6 | 0.6 | 5.3 | 0.45 | 0.57 | 0.40 |
|   Acids in Distillate | 0.5 | 0.018 | 0.020 | 12.7 | 0.91 | 4.8 |
| Inspections, Feed: | | | | | | |
|   Acids, Mol/Kg | 0.7409 | 0.7409 | 0.7409 | 0.758 | 0.758 | 0.758 |
|   Alcohols,[1] Wt. Percent | 7.0 | 7.0 | 7.0 | 7.0 | 7.0 | 7.0 |
| Distillate: | | | | | | |
|   Density at 20/4 | 0.8707 | 0.8529 | 0.8558 | 0.8907 | 0.8739 | 0.9018 |
|   Acids, Mol/Kg | 0.052 | Neg. | Neg. | 0.770 | 0.0911 | 0.391 |
|   Water, Wt. Percent | 24.9 | 19.1 | 19.0 | 52 | 27.4 | 40.0 |
|   Alcohols,[1] Wt. Percent | | 80.9 | 81.0 | 45.5 | 74.5 | |
| Bottoms: | | | | | | |
|   Density at 20/4 | 1.0056 | 1.0053 | 1.0056 | 1.0075 | 1.0072 | 1.0064 |
|   Acids, Mol/Kg | 0.777 | 0.800 | 0.810 | 0.802 | 0.802 | 0.822 |
|   Water, Wt. Percent | 94.4 | 90.8 | 92.5 | 94.0 | 93.2 | 94.5 |
|   Alcohols,[1] Mol/Kg | 0.006 | 0.006 | 0.05 | 0.004 | 0.005 | 0.0034 |

[1] Non-acids.

Table II

| Period Number | 1 | 2 |
|---|---|---|
| Feed, gm./hr | 1,467 | 1,465 |
| Distillate, gm./hr | 138 | 134 |
| Bottoms, gm./hr | 1,312 | 1,311 |
| Reflux Ratio | 2.1 | 3.9 |
| Top Temperature, °F | 185 | 184 |
| Still Temperature, °F | 214 | 213 |
| Yields, Wt. Percent: | | |
|   Distillate | 9.4 | 9.1 |
|   Bottoms | 89.4 | 89.4 |
|   Overhead: Non-Acid in Feed | 1.24 | 1.20 |
|   Weight Balance | 98.8 | 98.5 |
| Chemicals Recovery, Percent: | | |
|   Alcohols in Distillate | 94.9 | 90.1 |
|   Acids in Bottoms | 100.0 | 99.9 |
| Chemicals Loss, Percent: | | |
|   Alcohols in Bottoms | 0.6 | 0.4 |
|   Acids in Distillate | 0.4 | 0.3 |
| Inspections, Feed: | | |
|   Density at 20/4 | 0.9941 | 0.9941 |
|   Acids, Mol/Kg | 0.740 | 0.740 |
|   Water, Wt. Percent | 88.0 | 88.0 |
|   Alcohols,[1] Wt. Percent | 7.6 | 7.6 |
| Distillate: | | |
|   Density at 20/4 | 0.8618 | 0.8625 |
|   Acids, Mol/Kg | 0.032 | 0.026 |
|   Water, Wt. Percent | 23.1 | 24.7 |
|   Alcohols,[1] Wt. Percent | 76.7 | 75.1 |
| Bottoms: | | |
|   Density at 20/4 | 1.0055 | 1.0055 |
|   Acids, Mol/Kg | 0.827 | 0.837 |
|   Water, Wt. Percent | 94.9 | 94.6 |
|   Alcohols,[1] Mol/Kg | 0.01 | 0.007 |

[1] Non-acids.

Table III

| Run No. | 1 | 2 | 3 | 4 | 5 | 6 | 7 | 8 | 9 |
|---|---|---|---|---|---|---|---|---|---|
| Reflux Ratio, Reflux/Overhead Product | 1.0 | 1.0 | 1.0 | 2.2 | 2.5 | 2.6 | 2.5 | 2.0 | 1.7 |
| Feed Point | (1) | (1) | (1) | (1) | (1) | (1) | (2) | (2) | (2) |
| Top Temperature, °F | 191 | 193 | 203 | 182 | 188 | 186 | 195 | 204 | 203 |
| Acid Loss Overhead, Mol Percent | 1.2 | 1.8 | 4.1 | 0.3 | 0.9 | 0.4 | 2.4 | 1.9 | 2.0 |
| Overhead Yield, Wt. Percent | 7.6 | 8.5 | 9.1 | 5.9 | 7.9 | 7.3 | 7.5 | 4.7 | 5.5 |
| Bottoms Yield, Wt. Percent | 92.7 | 90.8 | 90.4 | 89.6 | 93.9 | 93.3 | 91.9 | 94.6 | 94.8 |
| Feed: | | | | | | | | | |
|   Wt. Percent Total Chemicals | 12.1 | 8.7 | 7.3 | 8.5 | 7.9 | 8.3 | 6.0 | 4.5 | 6.4 |
|   Wt. Percent Acid (Acetic Equiv.) | 3.2 | 3.1 | 2.6 | 2.6 | 3.3 | 3.3 | 3.4 | 3.4 | 3.2 |
|   Wt. Percent Non-Acid Chemicals | 8.9 | 5.6 | 4.7 | 5.9 | 4.6 | 5.0 | 2.6 | 1.1 | 3.2 |
| Overhead: | | | | | | | | | |
|   Wt. Percent Water | 31.6 | 36.0 | 49.0 | 23.6 | 28.9 | 26.9 | 38.9 | 51.7 | 51.3 |
|   Wt. Percent Chemicals | 68.4 | 64.0 | 50.6 | 76.4 | 71.1 | 73.1 | 61.1 | 48.3 | 48.7 |
|   Wt. Percent Acid (Butyric Equiv.) | 0.7 | 1.0 | 1.7 | 0.2 | 0.5 | 0.3 | 1.6 | 1.9 | 1.8 |
|   Wt. Percent Non-Acid Chemicals | 67.7 | 63.0 | 48.9 | 76.2 | 70.6 | 72.8 | 59.5 | 46.4 | 46.9 |
| Bottoms: | | | | | | | | | |
|   Wt. Percent Water | 96.3 | 97.3 | 94.7 | 97.2 | 98.4 | 95.6 | 98.8 | 97.7 | 95.2 |
|   Wt. Percent Acid (Acetic Equiv.) | 3.4 | 3.4 | 2.7 | 2.6 | 3.6 | 3.6 | 3.6 | 3.4 | 3.3 |
|   Non-Acid Chemicals, Mols/Kg. of Water | 0.08 | 0.05 | 0.03 | 0.02 | 0.03 | 0.03 | 0.01 | 0.03 | 0.01 |
| Overhead: Non-Acid in Feed | 0.85 | 1.52 | 1.94 | 1.00 | 0.72 | 1.46 | 2.89 | 4.27 | 1.72 |

[1] Middle.
[2] Lower.

The results obtained on a one-inch diameter glass laboratory column, employing high reflux ratio runs are summarized in Table I. These operations covered the reflux ratio range of 12–40:1 reflux to overhead product and proved the applicability of continuous fractionation to this separation. The critical inspections on the products are the acid and water in the distillate and the non-acids in the bottoms. The "alcohols," termed "non-acids," which are left in the bottoms are a source of contamination of the acids. Small concentrations are particularly desirable as the solution is so dilute that, based on the acid content, the concentration is increased greatly. When the correct amount of material was taken overhead, the inspections showed good separation. It will be noted from the foregoing data that sufficient water was present in the feed so that a bottoms fraction containing a major proportion of water was obtained.

The use of reflux ratios of the order of magnitude of those in the first fractions (12–40) would, of course, not be economical. Therefore, two experiments were run on the same column at two and four to one reflux ratios. The results are summarized on Table II. These runs gave separations as good, within the accuracy of the data, as did the high ratio runs. Lower reflux ratios were not employed because of the limitations of the column.

Another series of operations were performed on a second fractionation column of two-inch diameter stainless steel. This tower had more than one feed point and runs were made using the feed points one-quarter and one-half the way up the column. The results are summarized on Table III. The runs on this tower covered 1.0–2.6:1 reflux ratios. Operations at the 1:1 reflux ratio level seem to give somewhat poorer results than those at approximately 2:1 reflux ratio. The ratio reported as "overhead: non-acid in feed" is used to correct for different feeds.

From the data thus obtained, it will be apparent that the aforementioned separation between water-soluble organic acids and alcohols (which may include other non-acid oxygenated organic compounds, as well) can be easily attained by charging the mixture into a fractional distillation zone together with the necessary quantity of water, in accordance with the requirements indicated above. It will also be noted that this added quantity of water may be charged into the distillation zone either as a separate stream or combined externally with the feed mixture of acids and non-acids, prior to fractionation.

While a particular embodiment of the invention has been described for purposes of illustration, it should be understood that various modifications or adaptations thereof, which will be obvious to one skilled in the art, may be made within the spirit of the invention as set forth in the appended claims.

Having thus described my invention, I claim:

1. A method for separating the components of a substantially hydrocarbon-free mixture comprising a water-soluble organic acid and an alcohol which are close-boiling and which alcohol is capable of forming an azeotrope with water lower boiling than said acid and which mixture if distilled in the absence of water would produce a distillate containing a substantial proportion of said acid, which comprises charging said mixture into a fractional distillation zone, charging with said mixture water in a substantial amount into said zone, subjecting said mixture and water to fractional distillation to form a vapor phase and a liquid phase, and removing said alcohol as a vaporous fraction from the upper portion of said zone and a liquid residue comprising said acid from the lower portion of said zone, the quantity of water charged into said zone being sufficient to produce a bottoms fraction in which water is present in at least a major proportion.

2. A method for separating the components of a substantially hydrocarbon-free mixture comprising a water-soluble organic acid, and an alcohol which are close-boiling and which alcohol is capable of forming an azeotrope with water lower boiling than said acid and a vaporizable aldehyde and which mixture if distilled in the absence of water would produce a distillate containing a susbtantial proportion of said acid, which comprises charging said mixture into a fractional distillation zone, charging with said mixture water in a substantial amount into said zone, subjecting said mixture and water to fractional distillation to form a vapor phase and a liquid phase, and removing said alcohol and said aldehyde as a vaporous fraction from the upper portion of said zone and a liquid residue comprising said acid from the lower portion of said zone, the quantity of water charged into said zone being sufficient to produce a bottoms fraction in which water is present in at least a major proportion.

3. A method for separating the components of a substantially hydrocarbon-free mixture comprising a water-soluble organic acid, and an alcohol which are close-boiling and which alcohol is capable of forming an azeotrope with water lower boiling than said acid and a vaporizable ketone and which mixture if distilled in the absence of water would produce a distillate containing a substantial proportion of said acid, which comprises charging said mixture into a fractional distillation zone, charging with said mixture water in a substantial amount into said zone, subjecting said mixture and water to fractional distillation to form a vapor phase and a liquid phase, and removing said alcohol and said ketone as a vaporous fraction from the upper portion of said zone and a liquid residue comprising said acid from the lower portion of said zone, the quantity of water charged into said zone being sufficient to produce a bottoms fraction in which water is present in at least a major proportion.

4. A method for separating the components of a substantially hydrocarbon-free mixture comprising a water-soluble organic acid, and an alcohol which are close-boiling and which alcohol is capable of forming an azeotrope with water lower boiling than said acid and a vaporizable ester and which mixture if distilled in the absence of water would produce a distillate containing a substantial proportion of said acid, which comprises charging said mixture into a fractional distillation zone, charging with said mixture water in a substantial amount into said zone, subjecting said mixture and water to fractional distillation to form a vapor phase and a liquid phase, and removing said alcohol and said ester as a vaporous fraction from the upper portion of said zone and a liquid residue comprising said acid from the lower portion of said zone, the quantity of water charged into said zone being sufficient to produce a bottoms fraction in which water is present in at least a major proportion.

5. A method for separating the components of a substantially hydrocarbon-free mixture comprising a water-soluble organic acid having up to five carbon atoms per molecule and an alcohol which are close-boiling and which alcohol is capable of forming an azeotrope with water lower boiling than said acid and which mixture if distilled in the absence of water would produce a distillate containing a substantial proportion of said acid, which comprises charging said mixture into a fractional distillation zone, charging with said mixture water in a substantial amount into said zone, subjecting said mixture and water to fractional distillation to form a vapor phase and a liquid phase, and removing said alcohol as a vaporous fraction from the upper portion of said zone and a liquid residue comprising said acid from the lower portion of said zone, the quantity of water charged into said zone being sufficient to produce a bottoms fraction in which water is present in at least a major proportion.

6. A method for separating the components of a substantially hydrocarbon-free mixture comprising a water-soluble organic acid having up to five carbon atoms per molecule, and an alcohol which are close-boiling and which alcohol is capable of forming an azeotrope with water lower boiling than said acid and a vaporizable aldehyde and which mixture if distilled in the absence of water would produce a distillate containing a substantial proportion of said acid, which comprises charging said mixture into a fractional distillation zone, charging with said mixture water in a substantial amount in said zone, subjecting said mixture and water to fractional distillation to form a vapor phase and a liquid phase, and removing said alcohol and said aldehyde as a vaporous fraction from the upper portion of said zone and a liquid residue comprising said acid from the lower portion of said zone, the quantity of water charged into said zone being sufficient to produce a bottoms fraction in which water is present in at least a major proportion.

7. A method for separating the components of a substantially hydrocarbon-free mixture comprising a water-soluble organic acid having up to five carbon atoms per molecule, and an alcohol which is capable of forming an azeotrope with water lower boiling than said acid and a vaporizable ketone and which are close-boiling and which alcohol mixture if distilled in the absence of water would produce a distillate containing a substantial proportion of said acid, which comprises charging said mixture into a fractional distillation zone, charging with said mixture water in a substantial amount into said zone, subjecting said mixture and water to fractional distillation to form a vapor phase and a liquid phase, and removing said alcohol and said ketone as a vaporous fraction from the upper portion of said zone and a liquid residue comprising said acid from the lower portion of said zone, the quantity of water charged into said zone being sufficient to produce a bottoms fraction in which water is present in at least a major proportion.

8. A method for separating the components of a substantially hydrocarbon-free mixture comprising a water-soluble organic acid having up to five carbon atoms per molecule, and an alcohol which are close-boiling and which alcohol is capable of forming an azeotrope with water lower boiling than said acid and a vaporizable ester and which mixture if distilled in the absence of water would produce a distillate containing a substantial proportion of said acid, which comprises charging said mixture into a fractional distillation zone, charging with said mixture water in a substantial amount into said zone, subjecting said mixture and water to fractional distillation to form a vapor phase and a liquid phase, and removing said alcohol and said ester as a vaporous fraction from the upper portion of said zone and a liquid residue comprising said acid from the lower portion of said zone, the quantity of water charged into said zone being sufficient to produce a bottoms fraction in which water is present in at least a major proportion.

9. A method for separating the components of a substantially hydrocarbon-free mixture comprising a water-soluble organic acid, and an alcohol which are close-boiling and an aldehyde, said alcohol and said aldehyde being capable of forming azeotropes with water lower boiling than said acid and which mixture if distilled in the absence of water would produce a distillate containing a substantial proportion of said acid, which comprises charging said mixture into a fractional distillation zone, charging with said mixture water in a substantial amount into said zone, subjecting said mixture and water to fractional distillation to form a vapor phase and a liquid phase, and removing said alcohol and aldehyde as a vaporous fraction from the upper portion of said zone and a liquid residue comprising said acid from the lower portion of said zone, the quantity of water charged into said zone being sufficient to produce a bottoms fraction in which water is present in at least a major proportion.

10. A method for separating the components of a substantially hydrocarbon-free mixture comprising a water-soluble organic acid, and an alcohol which are close-boiling and a ketone said alcohol and said ketone, being capable of forming azeotropes with water lower boiling than said acid and which mixture if distilled in the absence of water would produce a distillate containing a substantial proportion of said acid, which comprises charging said mixture into a fractional distillation zone, charging with said mixture water in a substantial amount into said zone, subjecting said mixture and water to fractional distillation to form a vapor phase and a liquid phase, and removing said alcohol and ketone as a vaporous fraction from the upper portion of said zone and a liquid residue comprising said acid from the lower portion of said zone, the quantity of water charged into said zone being sufficient to produce a bottoms fraction in which water is present in at least a major proportion.

11. A method for separating the components of a substantially hydrocarbon-free mixture comprising a water-soluble organic acid, and an alcohol which are close-boiling and an ester, said alcohol and said ester being capable of forming azeotropes with water lower boiling than said acid and which mixture if distilled in the absence of water would produce a distillate containing a substantial proportion of said acid, which comprises charging said mixture into a fractional distillation zone, charging with said mixture water in a substantial amount into said zone, subjecting said mixture and water to fractional distillation to form a vapor phase and a liquid phase, and removing said alcohol and ester as a vaporous fraction from the upper portion of said zone and a liquid residue comprising said acid from the lower portion of said zone, the quantity of water charged into said zone being sufficient to produce a bottoms fraction in which water is present in at least a major proportion.

12. A method for separating the components of a substantially hydrocarbon-free mixture comprising a water-soluble organic acid having up to five carbon atoms per molecule, and an alcohol which are close-boiling and an aldehyde, said alcohol and said aldehyde being capable of forming azeotropes with water lower boiling than said acid and which mixture if distilled in the absence of water would produce a distillate containing a substantial proportion of said acid, which comprises charging said mixture into a fractional distillation zone, charging with said mixture water in a substantial amount into said zone, subjecting said mixture and water to fractional distillation to form a vapor phase and a liquid phase, and removing said alcohol and aldehyde as a vaporous fraction from the upper portion of said zone and a liquid residue comprising said acid from the lower portion of said zone, the quantity of water charged into said zone being sufficient to produce a bottoms fraction in which water is present in at least a major proportion.

13. A method for separating the components of a substantially hydrocarbon-free mixture comprising a water-soluble organic acid having up to five carbon atoms per molecule, and an alcohol which are close-boiling and a ketone, said alcohol and said ketone being capable of forming azeotropes with water lower boiling than said acid and which mixture if distilled in the absence of water would produce a distillate containing a substantial proportion of said acid, which comprises charging said mixture into a fractional distillation zone, charging with said mixture water in a substantial amount into said zone, subjecting said mixture and water to fractional distillation to form a vapor phase and a liquid phase, and removing said alcohol and ketone as a vaporous fraction from the upper portion of said zone and a liquid residue comprising said acid from the lower portion of said zone, the quantity of water charged into said zone being sufficient to produce a bottoms fraction in which water is present in at least a major proportion.

14. A method for separating the components of a substantially hydrocarbon-free mixture comprising a water-soluble organic acid having up to five carbon atoms per molecule, and an alcohol which are close-boiling and an ester, said alcohol and said ester being capable of forming azeotropes with water lower boiling than said acid and which mixture if distilled in the absence of water would produce a distillate containing a substantial proportion of said acid, which comprises charging said mixture into a fractional distillation zone, charging with said mixture water in a substantial amount into said zone, subjecting said mixture and water to fractional distillation to form a vapor phase and a liquid phase, and removing said alcohol and ester as a vaporous fraction from the upper portion of said zone and a liquid residue comprising said acid from the lower portion of said zone, the quantity of water charged into said zone being sufficient to produce a bottoms fraction in which water is present in at least a major proportion.

15. In a process for the catalytic hydrogenation of oxides of carbon in which the reaction product therefrom is treated to form a substantially hydrocarbon-free water product condensate, said water product condensate containing water-soluble organic acids and alcohols which are close-boiling and which alcohols are capable of forming azeotropes with water lower boiling than said acids and which water product condensate if distilled in the absence of water would produce a distillate containing a substantial proportion of said acids, the method for separating the components of said water product condensate which comprises: charging said water product condensate into a fractional distillation zone, charging with said water product condensate water in a substantial amount into said zone, subjecting the resulting mixture to fractional distillation to form a vapor phase and a liquid phase, and removing said alcohols as a vaporous fraction from the upper portion of said zone and a liquid residue comprising said acids from the lower portion of said zone, the quantity of water charged into said zone being sufficient to produce a bottoms fraction in which water is present in at least a major proportion.

16. In a process for the catalytic hydrogenation of oxides of carbon in which the reaction product therefrom is treated to form a substantially hydrocarbon-free water product condensate, said water product condensate containing water-soluble organic acids, and alcohols which are close-boiling and which alcohols are capable of forming azeotropes with water lower boiling than said acids and vaporizable aldehydes and which water product condensate if distilled in the absence of water would produce a distillate containing a substantial proportion of said acids, the method for separating the components of said water product condensate which comprises: charging said water product condensate into a fractional distillation zone, charging with said water product condensate water in a substantial amount into said zone, subjecting said mixture and water to fractional distillation to form a vapor phase and a liquid phase, and removing said alcohols and said aldehydes as a vaporous fraction from the upper portion of said zone and a liquid residue comprising said acids from the lower portion of said zone, the quantity of water charged into said zone being sufficient to produce a bottoms fraction in which water is present in at least a major proportion.

17. In a process for the catalytic hydrogenation of oxides of carbon in which the reaction product therefrom is treated to form a substantially hydrocarbon-free water product condensate, said water product condensate containing water-soluble organic acids, and alcohols which are close-boiling and which alcohols are capable of forming azeotropes with water lower boiling than said acids and vaporizable ketones and which water product condensate if distilled in the absence of water would produce a distillate containing a substantial proportion of said acids, the method for separating the components of said water product condensate which comprises: charging said water product condensate into a fractional distillation zone, charging with said water product condensate water in a substantial amount into said zone, subjecting said mixture and water to fractional distillation to form a vapor phase and a liquid phase, and removing said alcohols and said ketones as a vaporous fraction from the upper portion of said zone and a liquid residue comprising said acids from the lower portion of said zone, the quantity of water charged into said zone being sufficient to produce a bottoms fraction in which water is present in at least a major proportion.

18. In a process for the catalytic hydrogenation of oxides of carbon in which the reaction product therefrom is treated to form a substantially hydrocarbon-free water product condensate, said water product condensate containing water-soluble organic acids, and alcohols which are close-boiling and which alcohols are capable of forming azeotropes with water lower boiling than said acids and vaporizable esters and which water product condensate if distilled in the absence of water would produce a distillate containing a substantial proportion of said acids, the method for separating the components of said water product condensate which comprises: charging said water product condensate into a fractional distillation zone, charging with said water product condensate water in a substantial amount into said zone, subjecting said mixture and water to fractional distillation to form a vapor phase and a liquid phase, and removing said alcohols and said esters as a vaporous fraction from the upper portion of said zone and a liquid residue comprising said acids from the lower portion of said zone, the quantity of water charged into said zone being sufficient to produce a bottoms fraction in which water is present in at least a major proportion.

19. In a process for the catalytic hydrogenation of oxides of carbon in which the reaction product therefrom is treated to form a substantially hydrocarbon-free water product condensate, said water product condensate containing water-soluble organic acids having up to five carbon atoms per molecule and alcohols which are close-boiling and which alcohols are capable of forming azeotropes with water lower boiling than said acids and which water product condensate if distilled in the absence of water would produce a distillate containing a substantial proportion of said acids, the method for separating the components of said water product condensate which comprises: charging said water product condensate into a fractional distillation zone, charging with said water product condensate water in a substantial amount into said zone, subjecting the resulting mixture to fractional distillation to form a vapor phase and a liquid phase, and removing said alcohols as a vaporous fraction from the upper portion of said zone and a liquid residue comprising said acids from the lower portion of said zone, the quantity of water charged into said zone being sufficient to produce a bottoms fraction in which water is present in at least a major proportion.

References Cited in the file of this patent

UNITED STATES PATENTS

| Number | Name | Date |
|---|---|---|
| 2,070,503 | Ammon | Feb. 9, 1937 |
| 2,079,789 | Charles | May 11, 1937 |
| 2,175,879 | Contor | Oct. 10, 1939 |
| 2,184,555 | Kenyon | Dec. 26, 1939 |
| 2,204,652 | Bludworth | June 18, 1940 |
| 2,227,979 | Othmer | Jan. 7, 1941 |
| 2,290,483 | Othmer | July 21, 1942 |
| 2,317,949 | Burk | Apr. 27, 1943 |
| 2,407,920 | Cox | Sept. 17, 1946 |
| 2,438,300 | Schniepp | Mar. 23, 1948 |
| 2,476,788 | White | July 19, 1949 |
| 2,485,694 | Burchfield | Oct. 25, 1949 |
| 2,523,248 | Heinze | Sept. 19, 1950 |
| 2,533,675 | Marschner | Dec. 12, 1950 |

OTHER REFERENCES

Horsley: Analytical Chemistry, vol. 19, pages 508–600, August 1947.